Patented Aug. 13, 1935

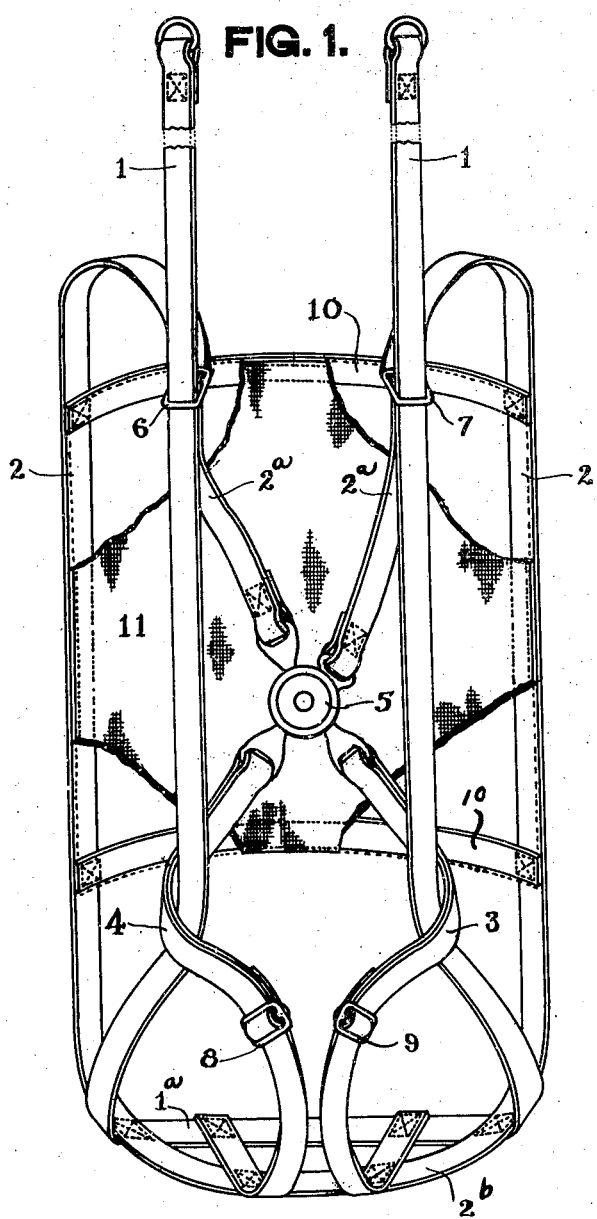

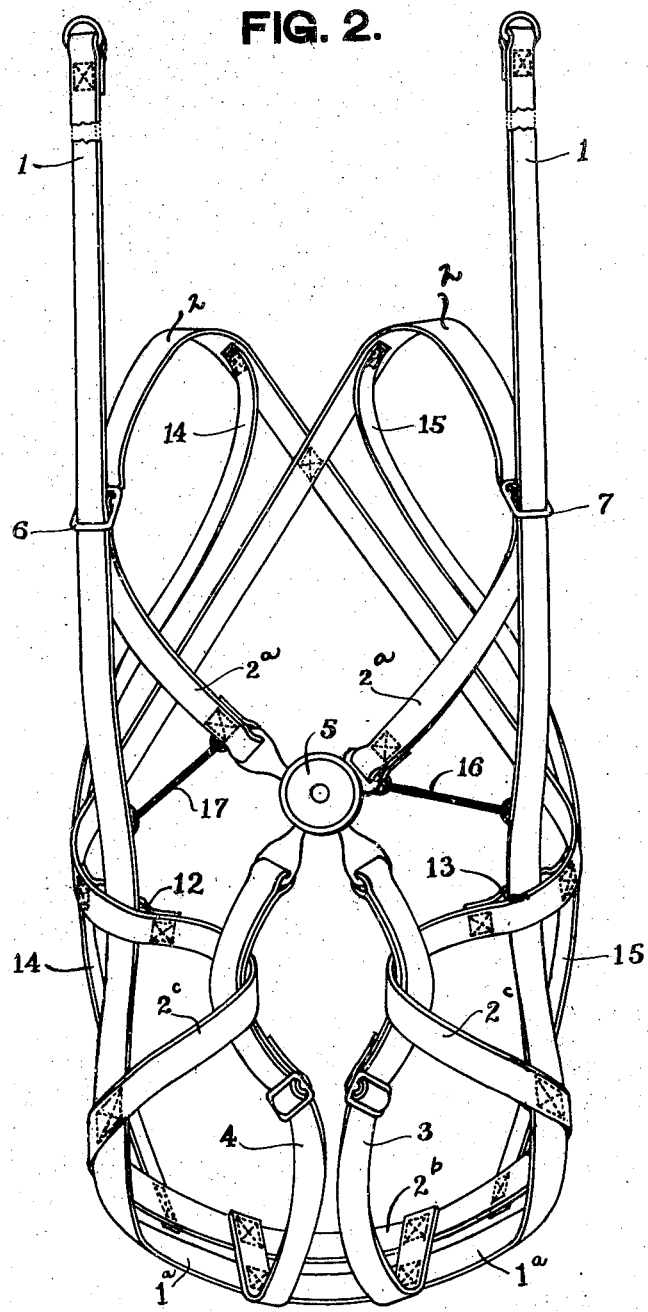

2,011,520

UNITED STATES PATENT OFFICE 2,011,520

PARACHUTE HARNESS

Stig Ove Christian Kuhlemann, Stockholm, Sweden, assignor to Irving Air Chute Co. Inc., Buffalo, N. Y.

Application August 13, 1934, Serial No. 739,649
In Sweden February 9, 1932

11 Claims. (Cl. 244—21)

The present invention relates to certain new and useful improvements in parachute harnesses, for which I have filed applications for patents in Sweden on the 9th of February, 1932 and 17th of February, 1932; in Germany on February 7, 1933, and in England on February 9, 1933; the invention particularly relating to an improved single point release parachute harness with improved means to insure safe application of the harness upon the wearer whereby shock and strain incident to opening and load support will be mainly transmitted to the seat of the harness and away from the single point releasable locking device.

The invention further relates to a parachute fitted with a central quick release device connecting a plurality of strap ends in one point. A number of such harnesses have been constructed during the last few years. Such harnesses are all characterized by the fact that the suspension straps are directly connected with the central locking device. Whereas this arrangement enables the wearer to get quickly free from the harness on landing, it is connected with a number of drawbacks in practical service and in jumping. Seeing that parachutes are now compulsory for military aviators in practically all countries, it is of the greatest importance that the harness should be as comfortable to wear as possible and not interfere with the proper navigation of the airplane. It is equally important that the harness is so constructed that it does not cause the user injury during a jump.

The following drawbacks are connected with harnesses in which the suspension straps pass direct to the locking device:

Firstly, the shock at the opening of the parachute is directly imparted to the locking device. The result is that the latter must be made comparatively strong and heavy in order to sustain the strain put upon it, especially at the high speeds of modern aviation.

Secondly, the locking device is so uncomfortably and forcefully pressed against the breast of the wearer that during a parachute jump it may cause him injury.

Thirdly, the suspension straps, converging directly from the locking device to the shroud lines, pass very close to the sides of the head of the user which may cause him damage in jumping.

In daily use the following inconveniences are experienced with central release harnesses of the kind used hitherto. The parachute pack in most instances is permanently attached to it in such manner that the aviator must use his one hand for holding the parachute pack and the other for connecting the ends of the suspension straps with the locking device. This is very difficult to do for one man and mostly requires the assistance of another. Another even more serious disadvantage is that the locking device hangs loosely forward, when the aviator is bending forward. This may interfere severely with the proper navigation of the airplane, especially so in "loopings" or similar manœuvres.

In the harnesses constructed according to this invention all the said drawbacks have been eliminated as will be shown below.

Instead of connecting the suspension straps directly with the locking device two branches from the said straps are arranged in such a way that the lock is only indirectly affected by the shock at the opening of the parachute. The result of this arrangement is that the lock can be made of relatively small dimensions and light in weight and still have the necessary strength. Through the said branches of the suspension straps the locking device does not get so hard pressed against the body as in harnesses used before. Further the suspension straps during a jump are spaced from the head of the user, thereby eliminating the risk of injury.

When putting on the harness the aviator can insert both his arms in the loops formed by the shoulder straps in about the same manner as when a waistcoat is put on. This being done he can use both his hands for connecting the strap ends with the locking device. In order to prevent the locking device from hanging loosely forward, means are provided for holding the locking device near the body of the user. This can either be done by pulling up the suspension straps or by connecting the locking device to the harness by elastic means. If either device is employed the inconvenience of the locking device pressing hard against the body of the user is still obviated.

Another advantage embodied in harnesses according to this invention is that the harness may be adjusted to the different sizes of aviators by only regulating two pairs of buckles.

Finally, it is possible to open the locking device in the air and still be safely sitting in the harness by holding one of the suspension straps with the hand. This may sometimes be important especially when landing in strong wind near some dangerous spot.

Figure 1 is a preferred embodiment of my invention showing the single point release harness with the strap portions connected.

Figure 2 is a modified form of the improved harness.

Referring to Figure 1, therein is shown a main load supporting U-shaped sling including suspension straps 1, and a seat strap 1ª. A second sling is provided, which includes shoulder straps 2 having front portions 2ª independently terminating in ends at the front of a wearer. The straps 2 extend from the shoulders downwardly at the rear of a wearer and terminate in a sling-like seat strap 2ᵇ. Numerals 3 and 4 designate leg straps, and 5 the central locking device. 6 and 7 are adjusting buckles; 8 and 9 adjusting buckles on the leg straps, and 10 are cross back straps connecting the side portions of the shoulder straps. 11 designates a piece of cloth on the back connecting the straps 10 and the side portions which extend downwardly from the shoulder straps 2.

In Fig. 2 the same numbers apply with the exception of Nos. 10 and 11. The following additional numbers represent, 12 and 13 small sleeves attached to the side portion 2ᶜ which extend downwardly from the shoulder straps, for the free passing of the suspension straps 1, 1. 14 and 15 represent two straps passing from the shoulder straps, along the sides of the wearer to the seat 2ᵇ, and 16, 17 are elastic means for holding the locking device to the body of the wearer in actual flight.

As will be seen from Fig. 1, the suspension straps 1, 1 are extended for the usual connection to the shroud lines of the parachute, and are connected with the shoulder straps 2, 2 by the adjusting buckles 6, 7. From there they pass in front and then at the sides and are connected to provide a sling seat. The shoulder straps 2, 2 have their front portion 2ª connected with the locking device 5 and are then passed over the shoulders, along the back of the wearer and are connected to also provide a sling seat placed parallel and connected with the seat of the suspension straps 1, 1. Through this arrangement, the user can sit on both sling seat straps, which increases the comfort in jumping and makes seat packs unnecessary, although the harness may be used with any type of pack.

The seat portions of the suspension straps 1, 1 and shoulder straps 2, 2 are held in position by the leg straps 3, 4 which are stitched to and extended across both of them. After circling round the inner sides of the legs, the leg straps pass behind the uprising lower portions of the suspension straps 1, 1. The leg straps are thus held in place at the sides of the wearer by the suspension straps, which is an important feature of the construction in that it tends to diverge the leg straps 3, 4, rather than straighten them close together between the legs during a jump. On landing and after the locking device has been manipulated, the leg straps 3, 4 are of course released from the locking device. Through the straightening of the load supporting suspension straps 1, 1, the leg straps then easily swing round the suspension straps and get altogether free. Of the shoulder straps front portion 2ª, the one is permanently fixed with the locking device, whereas the other one is released from the locking device when opened. The fixed location of one strap affords an attaching place for the manual release rip cord ring. The only manœuvre the user has to do after the lock has been opened is to shake off the shoulder straps in about the same manner as when a waistcoat is taken off. Jumps effected both on land and into water have proved that there is no difficulty in getting quickly free from harnesses constructed according to this principle. As mentioned above only two pairs of adjusting buckles are necessary for regulating the harness according to all sizes of aviators, viz. the buckles 6, 7 and 8, 9. This is no doubt a great advance as a great number of such buckles make harness adjustment much more difficult. The cross straps 10, 10 and the piece of cloth 11 are arranged for holding the body of the wearer securely inside the harness. If the locking device should fall forward in actual flying through the aviator having to bend forward, this can be adjusted by a pull on both the parts of the suspension straps running on either side of the locking device. When this is done the leg straps are carried to the sides, whereby the locking device is pulled closely against the body of the user. It is then held in this position through the friction between the suspension straps and the leg straps.

With reference to Fig. 2 the principle of this harness is the same although some details are different. This principal difference is that the leg straps 3, 4 are carried to the sides by looped extensions of the side portions 2ᶜ of the shoulder straps 2, 2 instead of by the suspension straps, as in Fig. 1. As in the case of Fig. 1 both the suspension straps 1, 1 and the shoulder straps 2, 2 have sling seat portions placed in substantial parallelism. In order to facilitate the leg straps 3, 4 to glide easily through the forwardly extended loops formed by the lower portions 2ᶜ of the shoulder straps 2, 2, the latter are fitted on the surface with some smooth material like leather. Elastic means 16, 17 are provided for preventing the locking device from falling forward. Such elastic means can either be attached on both or the one side of the locking device to one or two suitable neighbouring points on the harness. The shoulder straps 2, 2 in Fig. 2 diagonally cross each other at the back of the wearer, but it is also possible to use one or two cross straps connecting the shoulder straps. In a harness according to Fig. 1 the shoulder straps 2, 2 can also be made to diagonally cross each other at the back of the wearer. The crosswise straps on the back can be completed by one or two straps running across from the one suspension strap to the other as shown by 10, Fig. 1. The side straps 14, 15 are arranged for keeping the body of the wearer securely inside the harness.

Several modifications are possible without departing from the scope of the invention. Some have already been referred to above. Others are the following. Instead of letting extensions of the shoulder straps carry the leg straps to the sides, special straps can be arranged for such purpose, connected at the lower portion of the suspension straps 1, 1 near the sleeves 12 and 13 on Fig. 2. It is also possible to let such special straps cross behind the lower portion of the back between the shoulder straps. Another possible modification is to let the shoulder straps, 2, 2 run parallel along the back of the wearer to the seat and to connect them by diagonal cross straps. In such a case the side straps 14, 15 would be left out. Additional adjusting buckles will, however, probably be necessary by departing from the constructions illustrated on the drawings.

Having now particularly described and ascertained the nature of my invention and in what manner the same is to be used, I declare, that what I claim is:

1. In parachute harness the combination of upper body attaching straps including shoulder straps having the ends thereof for placement at the front of a wearer and adapted to extend over the shoulders of the wearer to the back of the wearer and thence downwardly to the seat of the wearer, lower body attaching straps connected with said portions of the upper body attaching straps which extend to the seat of the wearer including leg straps having the ends thereof for placement at the front of the wearer, a single quick release fastening device releasably connecting together the said ends of the shoulder and leg straps which are placed at the front of the wearer whereby upon release the wearer may free himself of the harness without releasing any other couplings, and a load supporting suspension sling in which the wearer sits as in a swing during a parachute descent having an adjustable connection at the upper part of the body of the wearer with said shoulder straps and being connected to the lower body attaching straps in non-interfering relation with release action of the fastener device and quick release of the harness from the wearer's body.

2. In parachute harness the combination of upper body attaching straps including shoulder straps having the ends thereof for placement at the front of a wearer and adapted to extend over the shoulders of the wearer to the back of the wearer and thence downwardly to the seat of the wearer, lower body attaching straps connected with said portions of the upper body attaching straps which extend to the seat of the wearer including leg straps having the ends thereof for placement at the front of the wearer, a quick release fastening device releasably connecting together the said ends of the shoulder and leg straps which are placed at the front of the wearer, and load supporting suspension straps at each of the side portions of the harness each having direct connection both at the upper part of the body of the wearer upon the respective adjacent shoulder straps and at the lower part of a wearer to the lower body attaching straps.

3. A parachute harness having shoulder straps, lower body attaching straps connected directly with the said shoulder straps, a central locking device releasably connecting said shoulder and lower body attaching straps together upon a wearer, load suspension means connected directly with both said shoulder and lower body attaching straps for leading part of the shock arising at the opening of the parachute away from the locking device, means for holding said central locking device from falling forward when the user is in a bent forward position, said last mentioned means consisting of elastic members connected with the central locking device and extending to and connected to other portions of the harness in a taut relation.

4. In parachute harness the combination of upper body attaching straps including shoulder straps having the ends thereof for placement at the front of the wearer and extending therefrom over the shoulders of the wearer to the back of the wearer and thence downwardly to form a seat portion on which the wearer sits as in a sling during a parachute descent, a suspension sling including suspension straps and a seat portion, the latter seat portion being connected to the seat portion first mentioned the said suspension straps of said suspension sling extending therefrom and having adjustable connections with the said shoulder straps and extending therefrom for connection with a parachute, leg straps connected with the seat portion of the sling and extending therefrom respectively around the outer sides of the respective adjacent suspension straps of the suspension sling to provide leg openings therewith for a wearer, and a single quick release fastening device for releasably connecting together the said ends of the shoulder and leg straps at the front of the wearer.

5. In a parachute harness the combination of upper body attaching straps including shoulder straps adapted to extend forwardly at the front of the wearer and over the shoulders of the wearer in crossing relation and thence around the opposite sides of a wearer and looped forwardly towards each other at the front of the wearer and thence continued to provide a sling-like seat portion adapted to extend under the seat of the wearer, leg straps connected with said seat portion and extending upwardly in releasably threaded relation through the respective forwardly looped portions above mentioned, a quick release locking device releasably connecting all of the said ends of the shoulder and leg straps together, and parachute load supporting suspension means having a load supporting connection with the seat portion aforesaid.

6. In a parachute harness the combination of upper body attaching straps including shoulder straps adapted to extend forwardly at the front of the wearer and over the shoulders of the wearer in crossing relation and thence around the opposite sides of a wearer and looped forwardly towards each other at the front of the wearer and thence continued to provide a sling-like seat portion adapted to extend under the seat of the wearer, leg straps connected with said seat portion and extending upwardly in releasably threaded relation through the respective forwardly looped portions above mentioned, a quick release locking device releasably connecting all of the said ends of the shoulder and leg straps together, and a U-shaped parachute load supporting suspension sling having a load supporting seat strap connection with the seat portion aforesaid and having upwardly extending webs provided with adjustable connections with said shoulder straps.

7. In a parachute harness the combination of upper body attaching straps including shoulder straps adapted to extend forwardly at the front of the wearer and over the shoulders of the wearer in crossing relation and thence around the opposite sides of a wearer and looped forwardly towards each other at the front of the wearer and thence continued to provide a seat portion adapted to extend over the seat of the wearer, leg straps connected with said seat portion and extending upwardly in releasably threaded relation through said loop portions, a single quick release locking device releasably connecting all of the said ends of the shoulder and leg straps together, a U-shaped supporting sling in which a wearer sits as in a swing during a parachute descent, including side parachute attaching suspension straps and a seat strap, said side suspension straps and seat strap being connected to the seat portion first mentioned in a cooperative seating relation, the looped portions aforesaid having sliding connection with the said suspension straps, and the said suspension straps at the upper part of the harness having adjustable connection with said shoulder straps.

8. In a parachute harness the combination of upper body attaching straps including shoulder straps having ends adapted to extend over the shoulders to lie at the front of the wearer, said upper body attaching straps at the rear of the wearer extending downwardly to provide a sling-like strap, a main load supporting sling including a seat strap connected to the sling-like seat strap first mentioned and having suspension straps extending upwardly at the front of the wearer independent of the downwardly extending continuation of the shoulder straps at the rear of the wearer, said suspension straps being connected to the shoulder straps at the front of the wearer in slidable adjustment therewith, and leg straps connected to the seat straps and extending around the outer sides of the suspension straps above mentioned to provide leg encircling loops and having the ends thereof independently terminating at the front of the wearer in the vicinity of the ends of the shoulder straps, and a single quick release fastener releasably connecting all of the ends of said shoulder and leg straps together at the front of the wearer.

9. In a parachute harness the combination of shoulder straps having independent ends extending to the normal front of a wearer and continuing downwardly at the back, a main U-shaped suspension sling including a sling seat and riser webs, the downwardly extending ends of said shoulder straps being connected with the U-shaped suspension sling adjacent the seat portion of the latter, the riser webs having non-fixed slidable adjustable connection with the shoulder straps forwardly below the shoulder portions proper thereof, leg straps connected with the seat of the sling and having ends extending to the normal front of a wearer, and a single quick release fastening device for releasably interconnecting the ends of the shoulder straps and leg straps together at the normal front of the wearer.

10. In a parachute harness the combination of a main supporting sling including a sling seat and side riser webs to which a parachute is to be connected, shoulder straps extending over the shoulders of the wearer and terminating in independent ends at the front of the wearer and extending at the back of the wearer downwardly and being connected with the sling adjacent to the seat thereof, and independent leg straps connected with the sling seat and extending in respectively trained relation around the outer sides of the web portions of the U-shaped sling to provide leg encircling loops and brought together in convergent relation at the front of the wearer between said web portions at the front of the wearer, and a single point release device releasably connecting all of the ends of the shoulder straps and leg straps together at one location at the normal front of a wearer.

11. In a parachute harness the combination of shoulder straps having front portions independently terminating in ends at the front of the wearer, said shoulder straps extending from the shoulders downwardly at the rear of a wearer and terminating in a sling-like seat strap, a main load supporting U-shaped sling including a seat strap and suspension straps, the upper portions of said suspension straps being connected with the shoulder straps at the shoulders of a wearer, the two seat straps lying adjacent to each other to provide a relatively wide strap arrangement for the wearer, and leg straps connected to the seat straps and holding them in definite adjacent relation, said leg straps terminating in ends at the front of the wearer adjacent to the said front portions, and a single point quick release device for connecting all of said ends of the leg straps and said front portions together.

STIG OVE CHRISTIAN KUHLEMANN.